(12) United States Patent  
Chen

(10) Patent No.: US 7,445,386 B2
(45) Date of Patent: Nov. 4, 2008

(54) RETAINING DEVICE FOR A LINEAR TRANSMISSION SYSTEM

(75) Inventor: Hsing-Liang Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 287 days.

(21) Appl. No.: 11/532,178

(22) Filed: Sep. 15, 2006

(65) Prior Publication Data

US 2008/0069486 A1 Mar. 20, 2008

(51) Int. Cl.
*F16C 29/06* (2006.01)
(52) U.S. Cl. ....................................... 384/45
(58) Field of Classification Search ............... 384/45, 384/43, 44, 49, 448
See application file for complete search history.

(56) References Cited

U.S. PATENT DOCUMENTS 3,345,723 A * 10/1967 Stilla et al. ............... 29/898.07
6,158,890 A * 12/2000 Hattori ........................ 384/45
2006/0285784 A1* 12/2006 Lin et al. ...................... 384/45

FOREIGN PATENT DOCUMENTS

JP          2002106560 A  *  4/2002

* cited by examiner

*Primary Examiner*—Thomas R Hannon
(74) *Attorney, Agent, or Firm*—Banger Shia

(57) ABSTRACT

A retaining device for a linear transmission system comprises: a sliding block, a rail clamp and a spring fastener The sliding block includes an upper retainer formed with a positioning hole. The rail clamp includes two retaining members and two elastic members, and the two retaining members are symmetrically arranged and are connected by the two elastic members. The two elastic members can adjust the interval between the two retaining members. The spring fastener is pivotally arranged between the two retaining members of the rail clamp and is provided with two elastic retaining portions to be engaged in the positioning hole of the upper retainer. After the rail clamp is installed in the sliding block, the two elastic members of the spring fastener will be engaged in the positioning hole, thus fixing the rail clamp in the sliding block.

5 Claims, 6 Drawing Sheets

RETAINING DEVICE FOR A LINEAR TRANSMISSION SYSTEM

BACKGROUND OF THE INVENTION

1. Field of the Invention

The present invention relates to a linear transmission system, and more particularly to a retaining device for a linear transmission system. The rail clamp can be closely installed in the sliding block, the spring fastener enables the rail clamp to be positioned in the sliding block very quickly, and the rail clamp can be disassembled easily with a small force, thus improving the positioning effect of the rail clamp while reducing the assembling and disassembling time.

2. Description of the Prior Art

Sliding block is installed on the rail, and a plurality of rolling elements is provided in the sliding block for enabling the sliding block to slide relative to the rail. When the sliding block is separated from the rail, the rolling elements will also fall off the sliding block. At this moment, rail clamp is used in assembly of the sliding block to prevent the rolling elements from falling off the sliding block. However, the conventional rail clamp itself cannot be fixed on the sliding block, plus the rolling elements are very sensitive, the rail clamp will disengage from the sliding block as long as it is tilted a bit, causing the fall-off of the rolling elements. After many improvements, a fixable rail clamp was made, such as the retaining device disclosed in JP Pt. No. 2002-106560, as shown in FIGS. 1 and 2, wherein the retaining device 10 comprises a rotary block 11 and a base 12.

The rotary block 11 is provided with a column 111 and two locking members 112. The column 111 protrudes out of the rotary block 11, and the two locking members 112 are oppositely and symmetrically formed on the outer surface of the column 111.

The base 12 is formed with a chamber 121 and two locking grooves 122. The chamber 121 is formed correspondingly to the shape of the column 111 of the rotary block 11, and the two locking grooves 122 are formed in the chamber 121 for mating with the locking members 112 of the rotary block 11.

The sliding block 11 is assembled on the base 12 in such a manner that the column 111 of the rotary block 11 is inserted in the chamber 121 of the base 12, and the locking members 112 of the rotary block 11 are engaged in the locking grooves 122 of the base 12.

It should install the rotary block 11 on either side of the retaining device 10 when assembling the retaining device 10 in the sliding block, and then rotate the rotary block 11 180 degrees about the column 111, so that the locking members 112 of the rotary block 11 will be locked in the locking grooves 122 of the base 12 after rotating 180 degrees. By rotating the rotary blocks 11 upward, the retaining device 10 can be fixed on the sliding block. Although it can be fixed on sliding block, this conventional retaining device has the following disadvantages:

Firstly, the retaining device 10 is fixed on the sliding block by rotating the rotary blocks 11 upward, and it must rotate the rotary blocks 11 whenever fixing or removing the retaining device 10. Furthermore, the conventional retaining device 10 cannot perfectly mate with the sliding block, and it will get a little loose even when both rotary blocks 11 are fixed.

Secondly, the two rotary blocks 11 are positioned by the engagement of the locking members 112 into the locking grooves 122. However, the locking members 112 of the rotary blocks 11 and the locking grooves 122 of the base 12 will wear out after a certain period of use. Therefore, the retaining device 10 must be replaced after a certain period of use, and this is not a small expenditure.

The present invention has arisen to mitigate and/or obviate the afore-described disadvantages.

SUMMARY OF THE INVENTION

The primary objective of the present invention is to simplify the assembly and disassembly process of the rail clamp. The present invention comprises: a sliding block, a rail clamp and a spring fastener. The sliding block includes an upper retainer formed with a positioning hole. The rail clamp includes two retaining members and two elastic members. When assembling the rail clamp into the sliding block, the two elastic members between the rail clamp are compressed and inserted into the sliding block, and ten the rail clamp is positioned in the sliding block by the spring fastener. And when disassembling the rail clamp, the user only needs to push the rail clamp slightly, the spring fastener will be disengaged form the sliding block, and the rail clamp can be removed from the sliding block.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
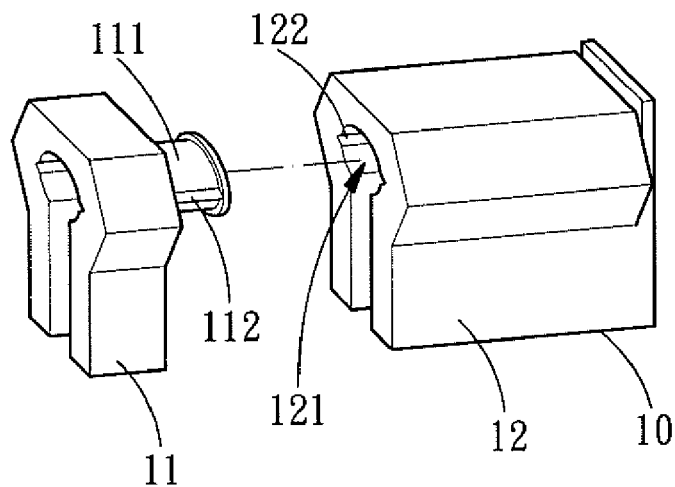
FIG. 1 is an exploded view of a conventional retaining device.
Figure 2:
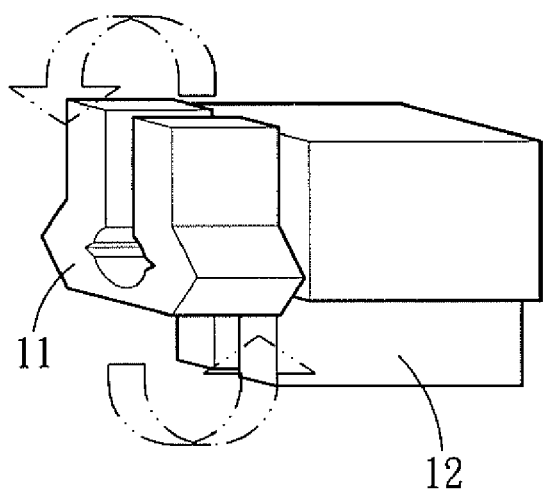
FIG. 2 is an assembly view of a conventional retaining device.
Figure 3:
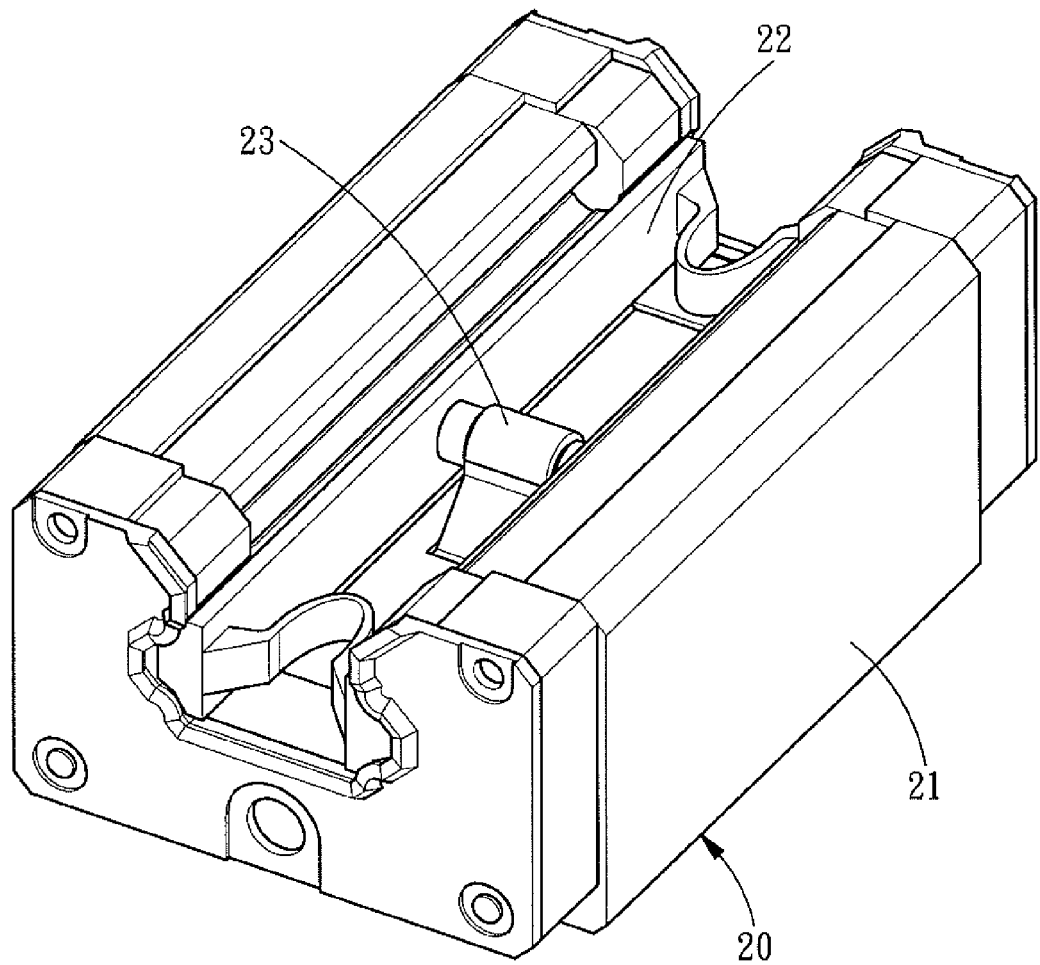
FIG. 3 is an assembly view of a retaining device for a linear transmission system in accordance with the present invention.
Figure 4:
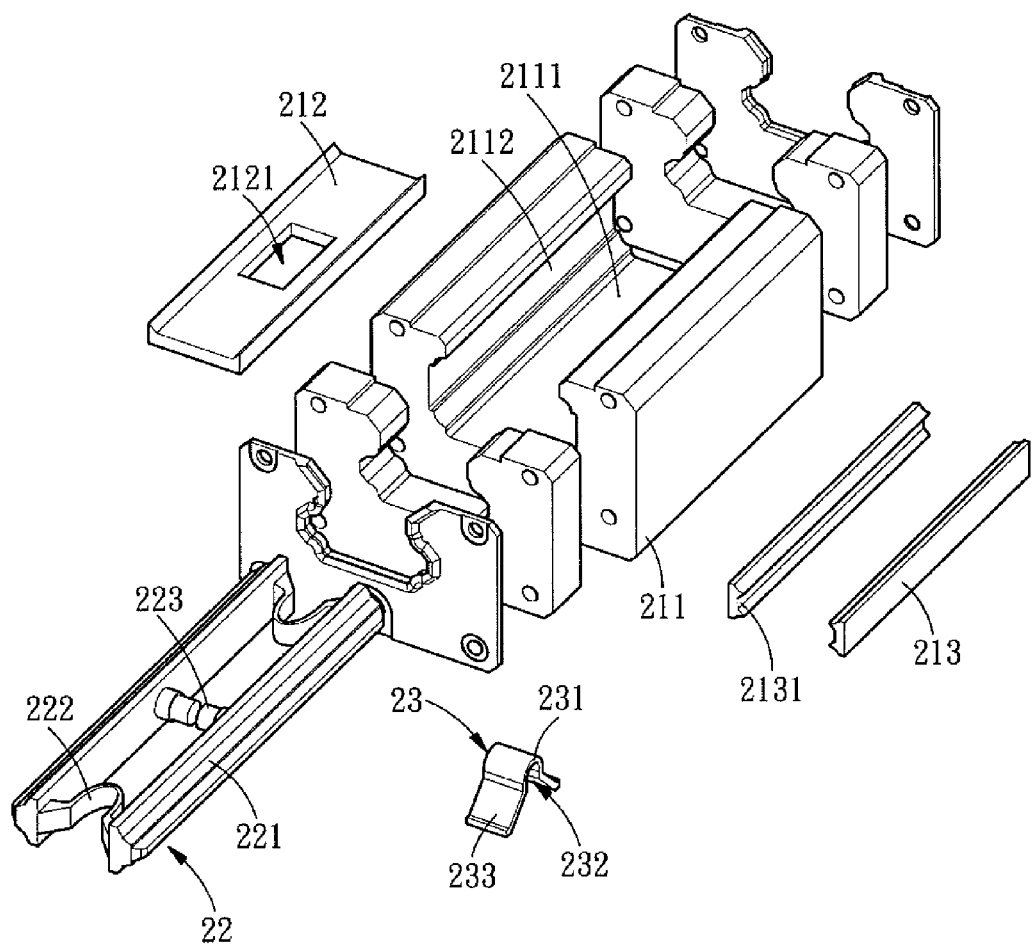
FIG. 4 is an exploded view of the retaining device for a linear transmission system in accordance with the present invention.

Referring to FIGS. 3 and 4, a retaining device 20 for a linear transmission system comprises: a sliding block 21, a rail clamp 22, and a spring fastener 23.

Figure 5:
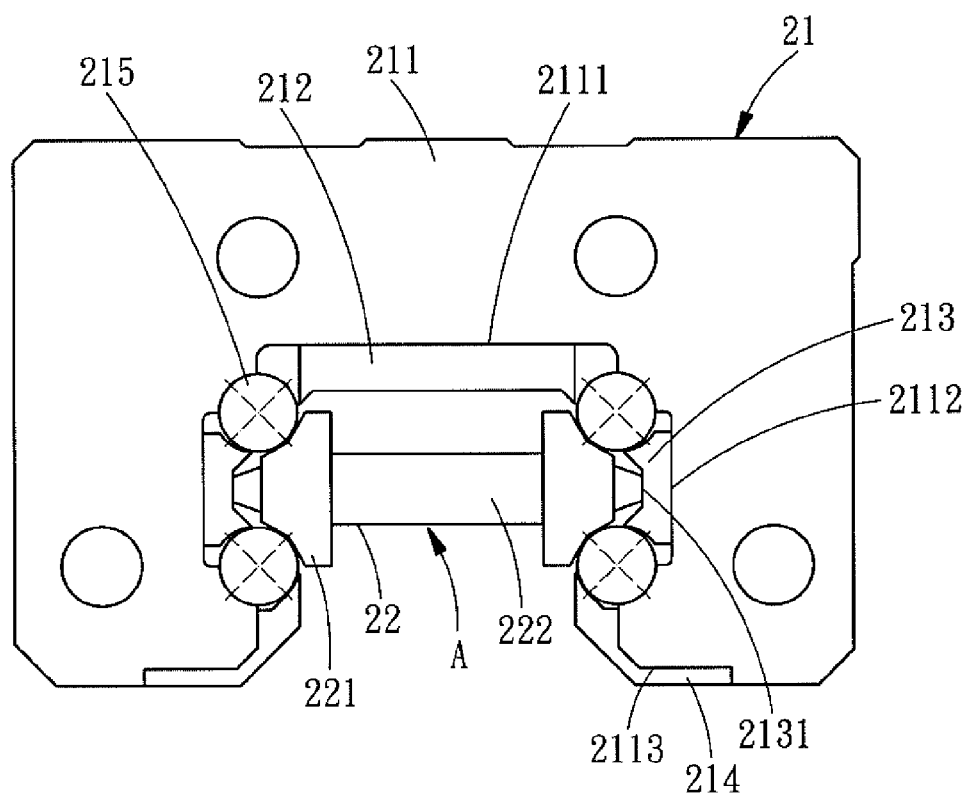
FIG. 5 is a cross sectional view of the retaining device for a linear transmission system in accordance with the present invention.

The sliding block 21 includes a base 211, an upper retainer 212, two mid retainers 213, two lower retainers 214, and a plurality of rolling elements 215. The base 211 is a U-shaped structure in cross section and has an upper connecting surface 2111, two mid connecting surfaces 2112, and two lower connecting surfaces 2113. The upper retainer 212 is disposed on the upper connecting surface 2111 of the base 211, and a rectangular positioning hole 2121 is formed in the upper retainer 212. The two mid retainers 213 are disposed on the two mid connecting surfaces 2112 of the base 211, and each has an abutting surface 2131. The two lower retainers 214 are disposed on the two lower connecting surfaces 2113 of the base 211. The rolling elements 215 are received in the space defined by the base 211, the upper retainer 212, the two mid retainers 213 and the two lower retainers 214, as shown in FIG. 5. The number of the through hole 2121 of the upper retainer 212 of the sliding block 21 can be 1, 2, 3 or more.

Figure 6:
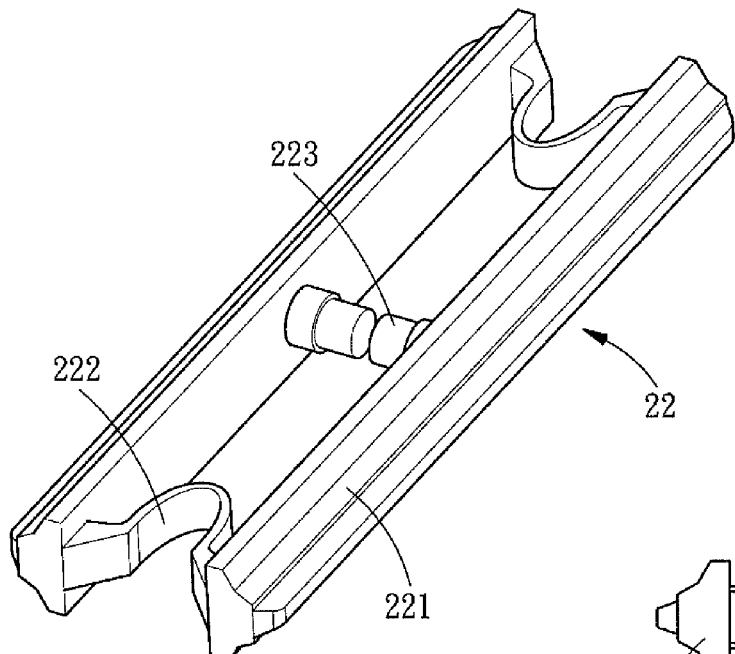
FIG. 6 shows a rail clamp of the retaining device for a linear transmission system in accordance with the present invention.
Figure 7:
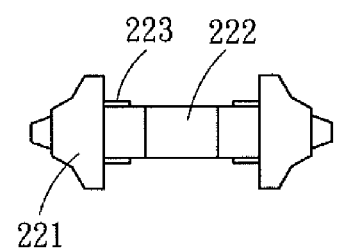
FIG. 7 is a cross sectional view of the rail clamp of the retaining device for a linear transmission system in accordance with the present invention.

The rail clamp 22 essentially includes two retaining members 221, two U-shaped elastic pieces 222 (an embodiment of the elastic member of the present invention), and two positioning pins 223 (an embodiment of the positioning member of the present invention) for retaining the spring fastener. The U-shaped elastic pieces 222 are arranged between the two retaining members 221, the two retaining members 221 are symmetrically positioned, and each retaining member 221 is provided with one positioning pin 223, as shown in FIGS. 6 and 7. To install the rail clamp 22 into the sliding block 21, the user can press the two retaining members 221 of the rail clamp 22 from both sides, the U-shaped elastic pieces 222 is deformed, and then pushes the rail clamp 22 into the space defined by the base 211, the upper retainer 212, the two mid retainers 213 and the two lower retainers 214. The two retaining members 221 of the rail clamp 22 are in close contact with the rolling elements 215 of the sliding block 21 and the abutting surface 2131 of the two mid retainers 213, as shown in FIG. 5. The number of the U-shaped elastic pieces 222 of the rail clamp 22 and the positioning pins 223 can also be one.

Figure 8:
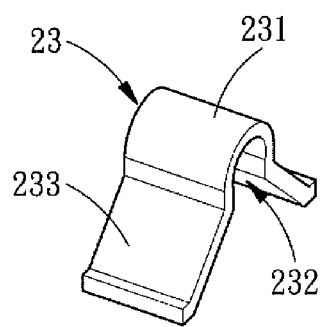
FIG. 8 shows a spring fastener of the retaining device for a linear transmission system in accordance with the present invention.
Figure 9:
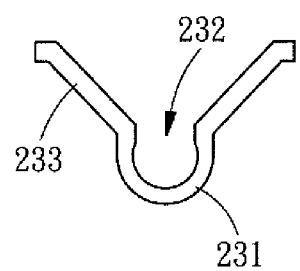
FIG. 9 is a cross sectional view of the spring fastener of the retaining device for a linear transmission system in accordance with the present invention.

The spring fastener 23 is approximately O-shaped in cross section and includes a receiving portion 231 and two elastic retaining portions 233 extending from the receiving portion 231. The receiving portion 231 is arc-shaped in cross section and serves to engage with the two positioning pins 223 of the rail clamp 22. The receiving portion 231 is tapered downward to form a gap 232 at the bottom thereof, and the two elastic retaining portions 233 are to be inserted and confined in the positioning hole 2121 of the upper retainer 212 of the sliding block 21. The interval between the two elastic retaining portions 233 is larger than the length of the positioning hole 2121, as shown in FIGS. 8 and 9.

Figure 10:
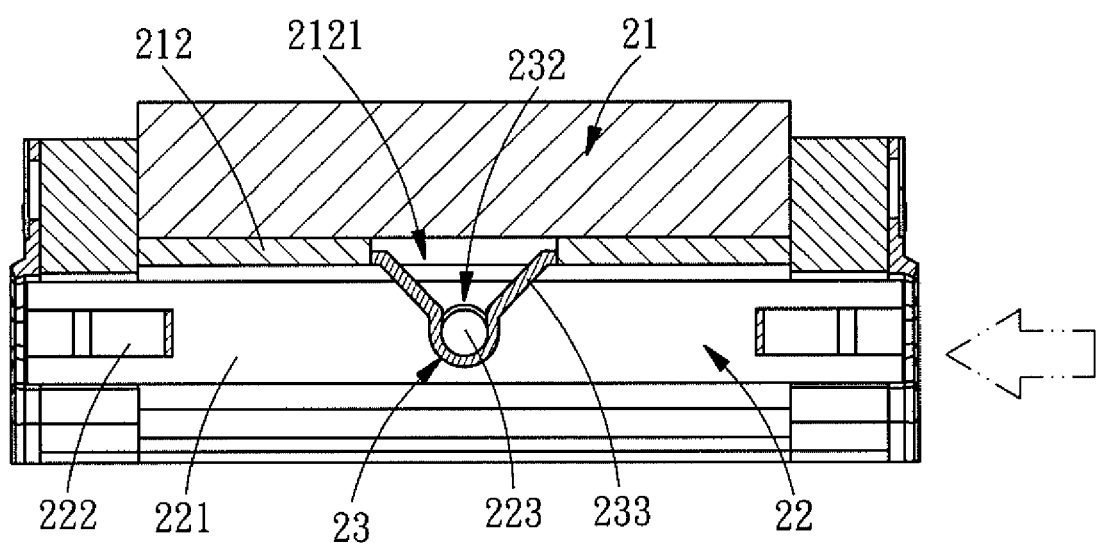
FIG. 10 is a cross sectional view of showing the retaining device for a linear transmission system in accordance with the present invention.

What follows are the advantages of the present invention:

Firstly, after the rail clamp 22 is assembled on the sliding block 21, the user only needs to press the receiving portion 231 of the elastic fastener 23 onto the two positioning pins 223 of the rail clamp 22, and then presses the two elastic retaining portions 233 from both sides and pushes them into the positioning hole 2121 of the upper retainer 212 of the sliding block 21. The two elastic retaining portions 233 will then recover and press against the inner edge of the positioning hole 2121. The gap 232 of the spring fastener 23 is smaller than the receiving portion 231 and the outer diameter of the two positioning pins 223, therefore, the spring fastener 23 can be firmly locked on the two positioning pin 223 without slipping, as shown in FIG. 10. To take off the rail clamp 22, the user only needs to push the rail clamp 22 in any direction, one of the elastic retaining portions 233 of the spring fastener 23 will be deformed, but the receiving portion 231 of the spring fastener 23 is still clamped on the two positioning pins 223 of the rail clamp 22. Therefore, the deformation force of the elastic retaining portion 233 will be converted into a rotating force making the spring fastener 23 rotate about the two positioning pins 223. When the rail clamp 22 is pushed to another one of the elastic retaining portions 233 and make it disengage from the positioning holes 2121, the spring fastener 23 will rotate about the two positioning pins 223, allowing the two elastic retaining portions 233 to disengage from the positioning hole 2121 completely. Therefore, it is very easy to assemble or to disassemble the rail clamp 22, unlike the conventional retaining device 10 that has to be provided with two rotary blocks 11, and the positioning effect of the present invention is better than the conventional retaining device 10.

Secondly, when inserting the rail clamp 22 into the sliding block, since the rail clamp 22 is larger than the space A, the two U-shaped elastic pieces 222 can be deformed to reduce the interval between the two retaining members 221 of the rail clamp 22, so that the rail clamp 22 can be inserted into the space A. After that, the two U-shaped elastic pieces 222 will recover and push the two retaining members 221 outward, so that the two retaining members 221 of the rail clamp 22 will be in close contact with the rolling elements 215 of the sliding block 21 and the abutting surface 2131 of the two mid retainers 213, as shown in FIG. 5, unlike the conventional retaining device 10 that will get a little loose even after being assembled. Further, the components for positioning the rail clamp 22 are made of elastic material, as composed to the conventional parts that will wear out and have to be replaced after a certain time of use.

To summarize, a retaining device for a linear transmission system in accordance with the present invention comprises: a sliding block, a rail clamp and a spring fastener. The sliding block includes an upper retainer formed with a positioning hole. The rail clamp includes two retaining members and two elastic members, and the two retaining members are symmetrically arranged and are connected by the two elastic members. The two elastic members can adjust the interval between the two retaining members. The spring fastener is pivotally arranged between the two retaining members of the rail clamp and is provided with two elastic retaining portions to be engaged in the positioning hole of the upper retainer. After the rail clamp is installed in the sliding block, the two elastic members of the spring fastener will be engaged in the positioning hole, thus fixing the rail clamp in the sliding block.

While we have shown and described various embodiments in accordance with the present invention, it is clear to those skilled in the art that further embodiments may be made without departing from the scope of the present invention.

What is claimed is:

1. A retaining device for a linear transmission system comprising:
 a sliding block having an upper retainer, at least one positioning hole formed in the upper retainer;
 a rail clamp installed in the sliding block and including at least one positioning member; and
 a spring fastener including a receiving portion and two elastic retaining portions extending from the receiving portion, the receiving portion being engaged with the positioning members of the rail clamp, the two elastic retaining portions being confined in the positioning hole of the upper retainer of the sliding block, in this way, the rail clamp is positioned in the sliding block.

2. The retaining device for a linear transmission system as claimed in claim 1, wherein the rail clamp includes two retaining members, at least one elastic member and the at least one positioning member, the elastic member and the positioning member are arranged between the two retaining members.

3. The retaining device for a linear transmission system as claimed in claim 2, wherein the rail clamp includes the two retaining members, two U-shaped elastic pieces, and two positioning pins for positioning spring fastener, the two retaining members are symmetrically arranged and are connected by the two U-shaped elastic pieces, each retaining member is provided with one positioning pin.

4. The retaining device for a linear transmission system as claimed in claim 3, wherein the spring fastener is approximately O-shaped in cross section and includes a receiving portion, a gap and two elastic retaining portions extending from the receiving portion, the receiving portion is arc-shaped in cross section and serves to engage with the two positioning pins of the rail clamp, the gap is smaller than an outer diameter of the two positioning pins.

5. The retaining device for a linear transmission system as claimed in claim 4, wherein a rectangular positioning hole is formed in the upper retainer of the retainer, and the two elastic portions of the spring fastener are confined in and press against an inner edge of the positioning hole.

* * * * *